Aug. 18, 1936.　　　E. S. MacPHERSON ET AL　　　2,051,263
MOTOR VEHICLE CONSTRUCTION
Filed June 5, 1933　　　2 Sheets-Sheet 1
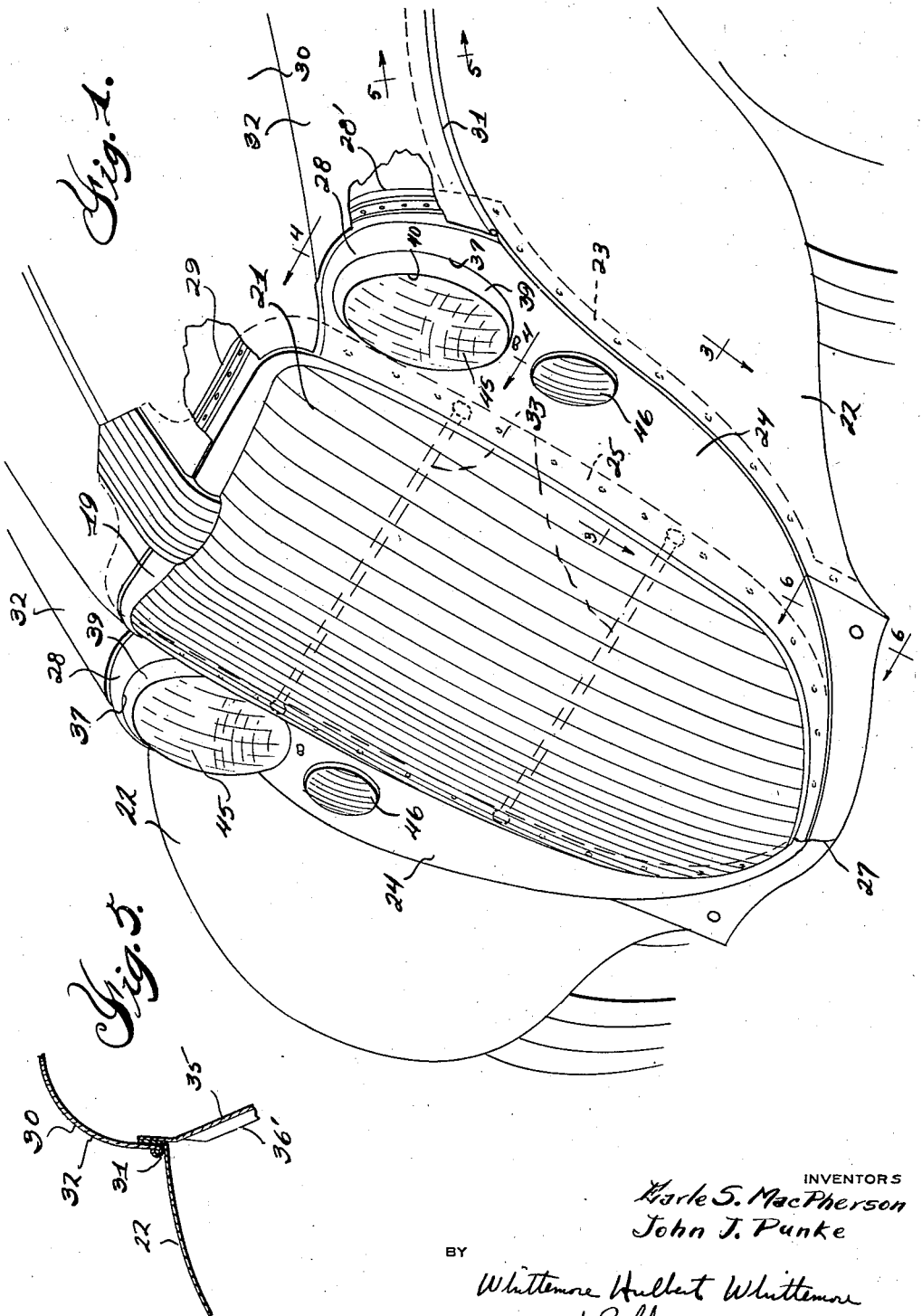
INVENTORS
Earle S. MacPherson
John J. Punke
BY
Whittemore Hulbert Whittemore
+ Belknap
ATTORNEYS Aug. 18, 1936.   E. S. MacPHERSON ET AL   2,051,263
MOTOR VEHICLE CONSTRUCTION
Filed June 5, 1933    2 Sheets-Sheet 2
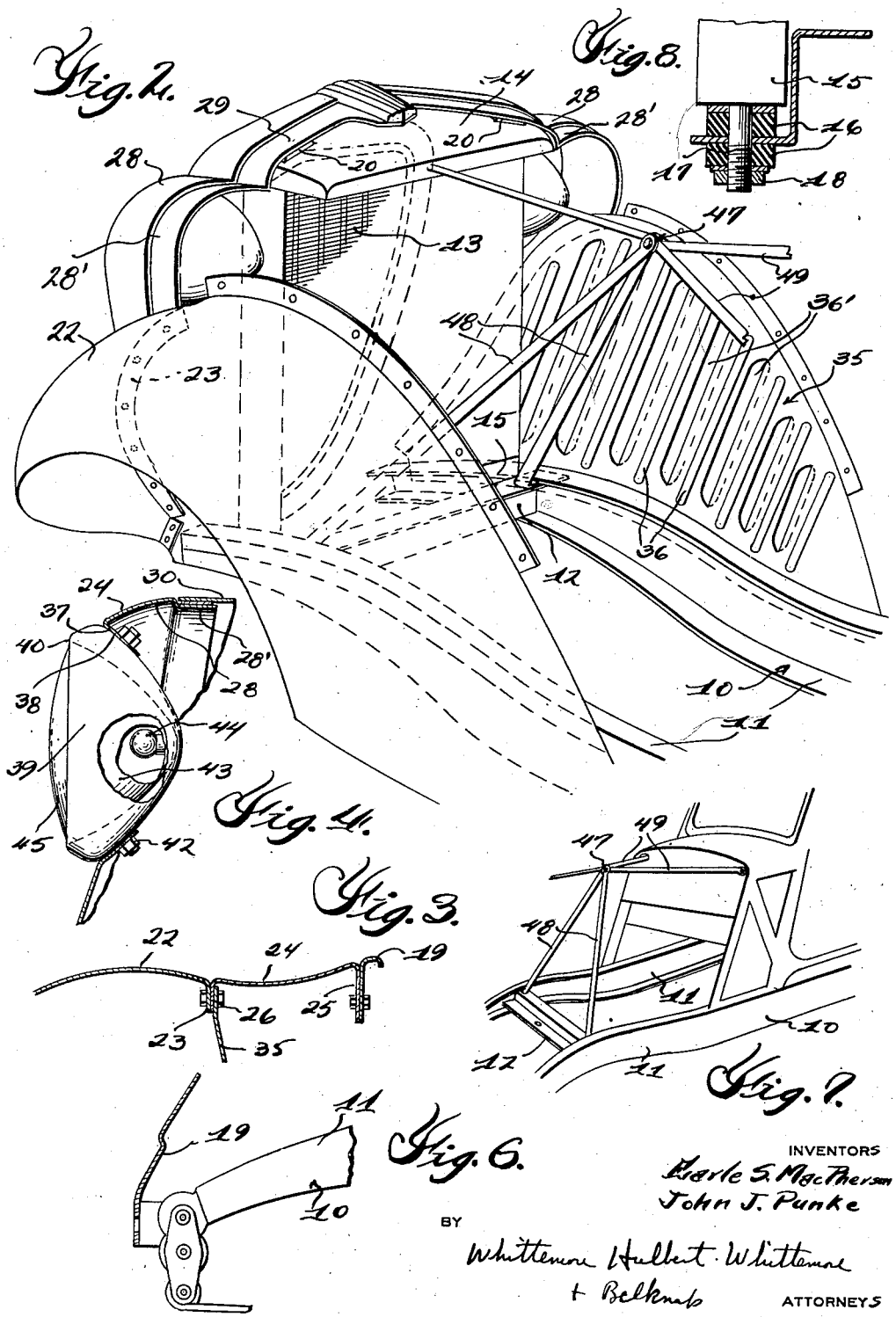
INVENTORS
Earle S. MacPherson
John J. Punke
BY Whittemore Hulbert Whittemore
+ Belknap    ATTORNEYS Patented Aug. 18, 1936

2,051,263

UNITED STATES PATENT OFFICE 2,051,263

MOTOR VEHICLE CONSTRUCTION

Earle S. MacPherson, Grosse Pointe Park, and John J. Punke, Detroit, Mich., assignors to Hupp Motor Car Corporation, Detroit, Mich., a corporation of Virginia Application June 5, 1933, Serial No. 674,442

8 Claims. (Cl. 180—69)

This invention relates generally to motor vehicles and refers more particularly to improvements in front end constructions for motor vehicles.

The present invention contemplates structurally improving the front ends of motor vehicles as well as appreciably enhancing the general appearance thereof by closing the space between the opposite sides of the radiator shell and adjacent fenders through the medium of wing sections having the additional function of interconnecting the opposite sides of the shell and the fenders.

Another object of the present invention resides in the provision of a front end construction of the general type specified above wherein the shell possesses the necessary inherent rigidity to form with the wing sections a sufficient structural tie between the fenders without the necessity of instituting unsightly and costly fender brackets in the assembly of the type employed in a number of vehicles now commercially produced.

Another advantageous feature of the present invention resides in the provision of a front end construction of the type set forth wherein the wing sections as well as the shell are rigidly secured to the chassis frame and wherein weaving of the front end assembly is eliminated by a torsional stabilizer connected to the shell and wing sections through the frame.

A still further object of the present invention resides in the provision of a front end construction wherein the hood for the motor compartment of the vehicle extends over the wing sections and seats upon the inner edges of the fenders.

In addition to the foregoing, the present invention contemplates supporting the head lamps of the vehicle on the wing sections in such a manner that only the forward portions of the lamps are visible and the rear portions concealed beneath the hood.

The foregoing as well as other objects will be made more apparent as this description proceeds, especially when considered in connection with the accompanying drawings, wherein:

Figure 1 is a fragmentary perspective view of a front end construction for a vehicle constructed in accordance with this invention;

Figure 2 is also a perspective view of a front end construction constructed in accordance with this invention with certain parts broken away for the sake of clearness;

Figure 3 is a sectional view taken substantially on the line 3—3 of Figure 1;

Figure 4 is a sectional view taken on the line 4—4 of Figure 1;

Figure 5 is a sectional view taken on the line 5—5 of Figure 1;

Figure 6 is a sectional view taken on the line 6—6 of Figure 1;

Figure 7 is a perspective view showing the chassis torsional stabilizer and the manner in which this member prevents weaving of the front end assembly of the vehicle;

Figure 8 is a fragmentary sectional view illustrating the mounting of the radiator core upon the frame.

Referring now to the drawings, it will be noted that there is fragmentarily illustrated in Figure 1 a front end construction of a motor vehicle comprising a frame 10 having sill members 11 secured together in lateral spaced relation at the forward end by means of a suitable cross member 12. Located adjacent the forward end of the frame 10 is a radiator core 13 of conventional design having upper and lower headers 14 and 15, respectively. Although the radiator core may be mounted upon the chassis frame in any suitable manner, nevertheless, for the purpose of illustration, we have shown the same in Figure 8 as flexibly secured to the cross member 12 intermediate the ends of the latter. In detail, a pair of rubber biscuits 16 is disposed upon opposite sides of the cross member at a point substantially centrally of the latter and a suitable stud 17 is permanently fixed to the lower wall of the bottom header 15 in such a manner as to extend through aligned openings formed in the biscuits and the portion of the cross bar 12 extending therebetween. The stud 17 is of such a length as to permit the lower end to project beyond the biscuit at the underside of the cross member and a suitable nut 18 is threaded upon the aforesaid end of the stud for clamping the radiator core to the cross member through the rubber biscuits.

In the present instance, the radiator 13 is provided with a shell 19 rigidly secured at the lower end to the forward ends of the sill members and supported upon the upper wall of the top header 14 through the medium of a pair of transversely spaced pads 20 carried by the header. The shell 19 preferably slopes downwardly and forwardly from the upper end of the radiator core in accordance with conventional practice, and a false front 21 of any suitable construction is secured within the shell in advance of the radiator.

Located upon opposite sides of the radiator shell in spaced relation thereto are the front fenders designated herein by the reference character 22. The fenders 22 are formed at the inner edges thereof with depending flanges 23 secured at the extreme forward ends of the fenders to the sides of the sills in any suitable manner. As pointed out above, the fenders are spaced from the adjacent side walls of the shell, and in the present instance, these spaces are closed by wing sections 24 having the additional function of interconnecting the fenders with the shell. In detail, the inner and outer edges of the wing sections are provided with rearwardly extending flanges 25 and 26 respectively secured to the side walls of the shell and the depending flanges 23 of the fenders through the medium of bolts or equivalent fastening means. The inner edge portions of the wing sections follow the contour of the sides and lower end of the shell, and the free ends of the sections are preferably welded or otherwise suitably joined at the center of the shell as designated by the reference character 27 to form in effect an apron below the shell. Both the wing sections are preferably stamped from sheet metal, and although in the specific embodiment of the invention, the wing sections are stamped from separate sheets of metal and united together, nevertheless, in some instances, it may be possible to stamp both wing sections from a single sheet of metal. In any event, the wing sections, aside from being permanently secured to the shell and fenders, are also secured at the lower ends to the bumper pads at the forward end of the sill members.

The upper edges of the wing sections are provided with rearwardly extending flanges 28 forming in effect a continuation of the upper side of the shell and having offset extensions 28' cooperating with a corresponding extension 29 on the shell to form a continuous seat for the forward edge of the hood 30 of the motor compartment. In this connection, it is to be noted that the lower edges of the side walls of the hood designated herein by the reference character 31, conform in contour to the shape of the fenders and preferably seat upon the inner edges of the latter. With this construction, it will be seen that the opposite side walls of the hood have outwardly bulged portions 32 which extend over the upper ends of the wing sections to the fenders and thereby conceal the space which normally exists between the fenders and motor compartment. If desired, the outwardly bulged portions 32 may be tapered toward the rear of the body and inclined inwardly so as to merge into the general plane of the side panels of the body at the rear ends thereof.

As previously stated, it is one of the principal objects of the present invention to provide a shell which inherently possesses the required rigidity to form with the wing sections, a sufficient structural tie between the fenders without the assistance of the usual fender braces. The foregoing is accomplished herein by either die casting the shell or stamping the latter from relatively heavy gauge sheet metal and providing reinforcing members between the side walls of the shell. In the present instance, the reinforcing members are designated by the reference character 33 and are preferably in the form of tie bars having the opposite ends rigidly secured to the opposite side walls of the shell within the latter. The construction is such that the tie bars cooperate with the wing sections to form a rigid connection between the fenders 22, and by reason of the same, it is not necessary to provide additional bracing structure. In order to insure rigidly supporting the fenders and at the same time close the space between the lower edges of the hood section 30 and frame, we provide each fender with an apron 35. As shown particularly in Figure 2, the upper ends of the aprons are secured to the portions of the depending flanges 23 on the fenders in rear of the wing sections 24, and the lower ends of the aprons are fixedly secured to the sills. If desired, the aprons may be ribbed as at 36 to increase the rigidity of the same, and thereby form a more stable connection between the fenders and frame.

The aprons 35, in addition to having the ribs 36 therein, may also be provided with louvers 36' establishing communication between the engine compartment and the atmosphere. The louvers may be of any suitable type and preferably opened toward the rear of the body so that displacement of the air in the motor compartment through the louvers is facilitated by the forward motion of the vehicle.

The wing sections, in addition to performing the functions hereinbefore stated, also operate to support the head lamps on the vehicle, and this is accomplished in the present instance in the manner shown particularly in Figure 4 of the drawings. In detail, the upper portions of each of the wing sections 24 are formed with an opening 37 therethrough having the marginal edges bent inwardly to form an annular flange 38 of sufficient diameter to receive the rear end portion of a head lamp casing 39 and form an abutment for the casing to locate the latter with the lens-receiving portion 40 thereof projecting outwardly from the wing section. The flange 38 and portion of the lamp casing with which the same engages are formed with a corresponding degree of curvature so as to provide for restricted tilting of the casing 39 with respect to the flange, and thereby obtain an adjustment of the beam of light projected by the lamp. In order to secure the casing to the flange 38 and at the same time permit the above mentioned adjustment, the casing is provided with a plurality of spaced outwardly extending studs projecting through elongated openings formed in the flange 38 and threaded at the extremities thereof for receiving the clamping nuts 42. In addition, each of the lamps is provided with reflectors 43 suitably mounted within the casing 39 and designed to reflect the light rays produced by the bulb 44 through a suitable lens 45 extending across the front face of the casing and reflector. Inasmuch as the side walls of the hood section 30 extend over the upper edges of the wing sections 24 as previously stated, it will be apparent that only the forward portions 40 of the head lamps will be visible. Attention is also directed to the fact at this point that the horns for the vehicle may be mounted in rear of the wing sections and the latter formed with openings 46 arranged to register with the forward end portions of the horns.

It has also been previously pointed out above that weaving or distortion of the front end assembly, including the radiator shell, side wing sections and fenders, is eliminated, and this is accomplished herein by providing a torsional stabilizer for the frame. The stabilizer featured herein is designated in Figure 7 by the reference character 47, and comprises in general a brace having tension or compression members interconnecting the forward portions of both sills with the body structure. In detail, a pair of structural members cooperate with the cross bar 12 of the chassis frame to form a triangular section 48 extending transversely of the frame with the apex located above the latter and secured to the forward end of the body by means of a second triangular section 49 having the apex secured to the apex of the section aforesaid and having the extremities of adjacent sides thereof fixed to the body adjacent opposite sides of the latter. This construction is similar to the one set forth in the assignee's Patent No. 1,915,117, dated June 20, 1933, and as pointed out in this latter application, prevents distortion of the sill members. Inasmuch as the radiator shell, side wings and fenders are each secured to the frame as well as to each other, stabilization of the forward end of the chassis frame in the manner specified above will also serve to stabilize this assembly and thereby materially increase the rigidity of the same.

What we claim as our invention is:

1. In a front end construction for vehicles, a radiator shell having a hood engaging seat, fenders located on opposite sides of the shell in spaced relation thereto, wing sections interposed between opposite sides of the shell and fenders to close the space therebetween and having hood engaging seats at the upper ends thereof forming in effect a continuation of the hood engaging seat on the shell, and means for securing the wing sections to the fenders and shell.

2. In a front end construction for vehicles having an engine compartment, a radiator shell at the forward end of the engine compartment and having a hood engaging seat at the upper end thereof, fenders located on opposite sides of the shell in spaced relation thereto, wing sections interposed between the shell and fenders and having hood engaging seats at the upper ends forming continuations of the hood engaging seat on the shell, means for securing the inner edges of the wing sections to the shell and for securing the outer edges of said sections to the fenders, head lamps supported by the wing sections with the forward ends thereof extending through openings in said sections, and a hood for the engine compartment having the forward end extending over said seats in engagement therewith and having the side edges terminating adjacent the inner edges of said fenders whereby the latter cooperate with the hood and wing sections to close the engine compartment as well as to conceal the portions of the head lamps projecting rearwardly from the wing sections.

3. In a front end construction for vehicles having an engine compartment, a radiator shell at the forward end of the engine compartment and having a hood engaging seat at the upper side thereof, fenders located on opposite sides of the shell in spaced relation thereto, wing sections interposed between the shell and fenders and having hood engaging seats at the upper ends thereof forming continuations of the hood engaging seat on the shell, means for securing the wing sections to both the shell and fenders, and a hood for the engine compartment seated at the forward end upon said seats and having the lower edges of the side walls thereof conforming to the fender line and terminating adjacent the inner edges of the fenders.

4. In a front end construction for vehicles having an engine compartment, a radiator shell at the forward end of said compartment, fenders located on opposite sides of the shell in spaced relation thereto and having aprons extending downwardly from the inner edges thereof, wing sections interposed between the shell and fenders and secured to both of the latter, a reinforcing member extending transversely of the shell between the side walls of the latter and cooperating with the wing sections to form a structural tie between the fenders, and a hood cooperating with the fender aprons and wing sections to close said engine compartment.

5. In a front end construction for vehicles having an engine compartment, a radiator front at the forward end of the engine compartment and having a hood engaging seat at the upper end thereof, fenders located on opposite sides of the front in spaced relation thereto, wing portions interposed between the front and fenders closing the space therebetween and having hood engaging seats at the upper ends forming continuations of the hood engaging seat on the front, head lamps supported by the wing portions with the forward ends thereof extending through openings in the wing portions, and a hood for the engine compartment having the forward end extending over the aforesaid seats in engagement therewith and having the opposite side edges terminating adjacent the inner edges of the fenders whereby portions of the latter cooperate with the hood and wing portions to close the engine compartment as well as to conceal the portions of the head lamps projecting rearwardly from the wing portions.

6. In a front end construction for vehicles having an engine compartment, a radiator front at the forward end of the engine compartment and having a hood engaging seat at the upper side thereof, fenders located on opposite sides of the front in spaced relation thereto, wing portions interposed between the front and fenders closing the space therebetween and having hood engaging seats at the upper ends forming continuations of the hood engaging seat on the front, and a hood for the engine compartment seated at the forward end upon the aforesaid seats and having the lower side edges terminating adjacent the inner edges of the fenders whereby portions of the latter cooperate with the hood and wing portions to close the engine compartment.

7. In a front end construction for vehicles having an engine compartment, a radiator front at the forward end of the compartment, fenders located on opposite sides of the radiator front in spaced relation thereto, wing portions interposed between opposite sides of the radiator front and fenders closing the space therebetween and cooperating with the radiator front to form a structural tie between the fenders, head lamps supported by the wing portions with the forward ends thereof extending through openings in said portions, and a hood cooperating with the wings and portions of the fenders to close the engine compartment and to conceal the portions of the head lamps projecting rearwardly from the wing portions.

8. In a front end construction for motor vehicles having an engine compartment and having a radiator at the front end of the engine compartment, fenders disposed upon opposite sides of the vehicle at the forward end thereof, a radiator front extending transversely of the vehicle in advance of the radiator and having wings extending laterally outwardly from opposite sides thereof secured to the fenders to form a structural tie therebetween, head lamps supported by the wing portions with the forward ends extending through openings in said portions, and a hood cooperating with the wings and portions of the fenders to close the engine compartment and to conceal the portions of the lamp casings extending rearwardly from the wings.

EARLE S. MacPHERSON.
JOHN J. PUNKE.